May 14, 1963  R. W. RIECK  3,089,559
VEHICLE ENGINE AND DRIVELINE MOUNTING
Filed Oct. 16, 1959  3 Sheets-Sheet 1

RUSSELL W. RIECK
INVENTOR.

BY John R. Faulkner
Clifford L. Sadler

ATTORNEYS

May 14, 1963 R. W. RIECK 3,089,559
VEHICLE ENGINE AND DRIVELINE MOUNTING
Filed Oct. 16, 1959 3 Sheets-Sheet 2

RUSSELL W. RIECK
INVENTOR.

BY John R. Faulkner
Clifford L. Sadler

ATTORNEYS

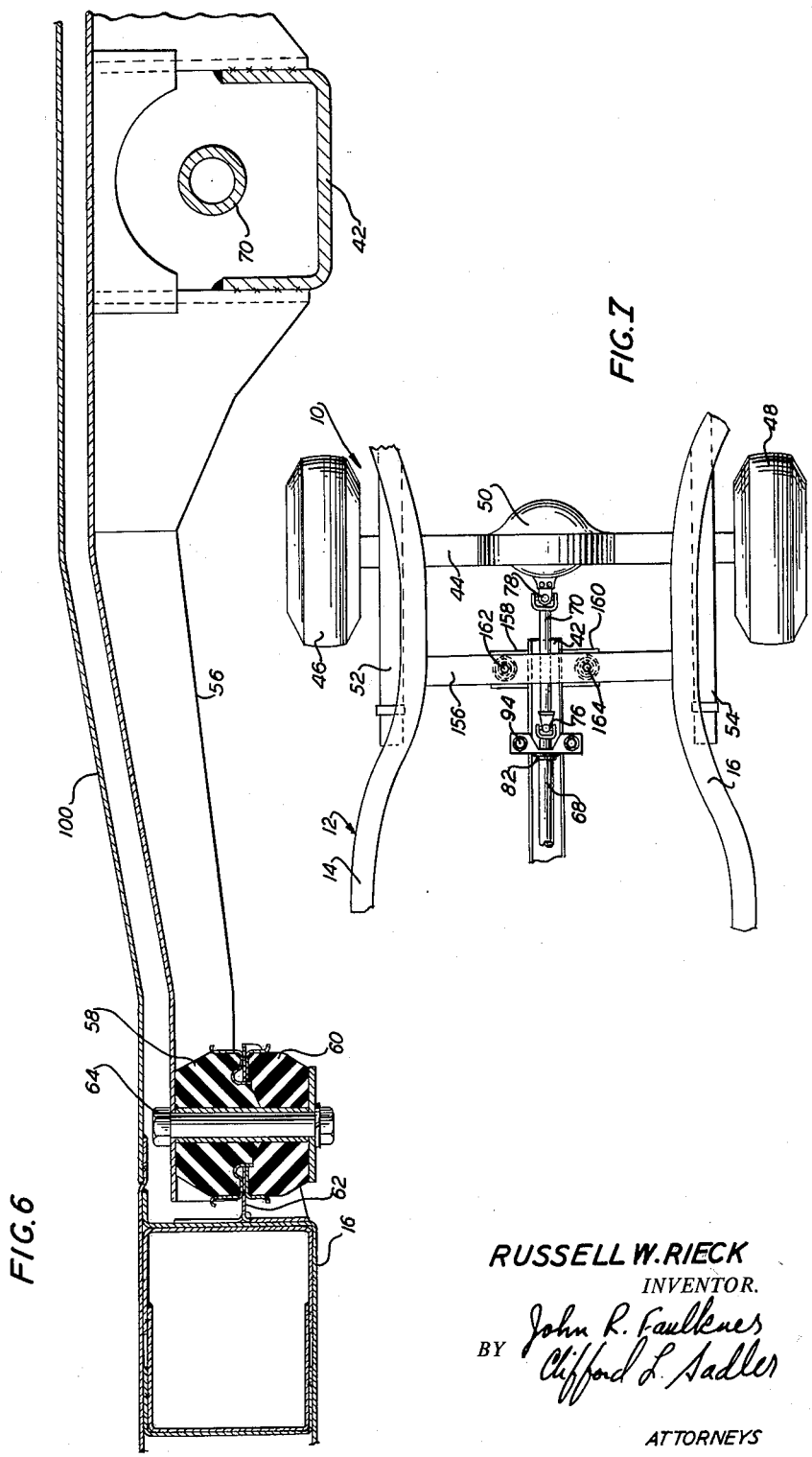

United States Patent Office 3,089,559
Patented May 14, 1963

3,089,559
VEHICLE ENGINE AND DRIVELINE MOUNTING
Russell W. Rieck, Detroit, Mich., assignor to Ford Motor Company, Dearborn, Mich., a corporation of Delaware
Filed Oct. 16, 1959, Ser. No. 846,832
2 Claims. (Cl. 180—64)

The present invention relates to motor vehicles generally and more particularly to the resilient mounting of automotive engines and drive shafts.

In the present state of the automotive art, it is considered highly desirable to lower the center of gravity and silhouette of the vehicle and further to reduce the vibration and noise associated with its operation. It is the principal aim of this invention to provide means for achieving both of those objectives.

When the height of an automobile is reduced, the seats and floor pan must also be lowered to provide the necessary head room within the vehicle, however, in a motor vehicle having a front engine and a rear wheel drive, the drive shaft which extends from the engine to the rear axle presents an obstacle to the lowering of the floor pan. In order to accommodate adequate clearance for the shaft, it is common to form a raised "tunnel" in the floor. However, in a conventional six passenger vehicle, a large tunnel is considered highly undesirable as it interferes with the foot room of the middle passenger of both the front and rear seats.

In general, this invention comprehends a T-shaped supporting structure for the engine and drive shaft of a motor vehicle. The structure has a longitudinal central member secured to the engine and extending rearwardly juxtaposed the drive shaft. It rotatably supports the shafting which is formed of a series of universal joint connected shaft sections. The drive shaft, being segmented, may be located as desired at a lower height in the region under the passenger compartment. The T-shaped structure also includes a cross member resiliently connected to the vehicle frame. This resilient mounting constitutes the rear support of engine.

It is the principal object of the present invention to provide means permitting a lower drive shaft and, therefore, lower floor pan of a front engine rear wheel drive automobile.

It is a further object of the present invention to provide a mounting structure for a segmented drive shaft formed of a plurality of shaft sections to permit flexibility of design location.

It is another object of this invention to have a sub frame structure that supports the rear end of the engine and extends about the propeller shaft for protective purposes.

It is also considered desirable to reduce the transmission of engine noise and vibration to the passenger compartment of the automobile and, therefore, it is also a main object of the present invention to provide a novel wide spaced resilient mounting arrangement for the engine and propeller shaft of an automobile.

The above objects and features of the invention including various desirable details of structure will be apparent from the following description of the illustrated embodiment shown in the accompanying drawings, in which:

FIGURE 6 is a sectional view taken along lines 6—6 of FIGURE 2; and

FIGURE 7 is a plan view of a portion of a chassis incorporating another modification of this invention.

Figure 1:
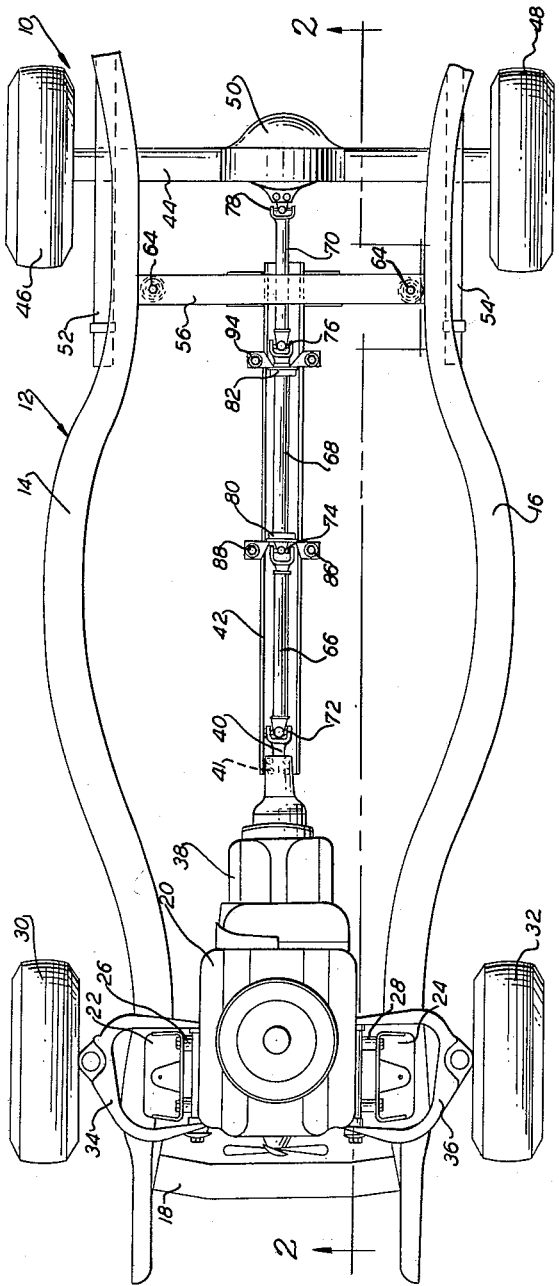
FIGURE 1 is a plan view of the chassis of an automobile incorporating the preferred embodiment of the present invention.
Figure 2:
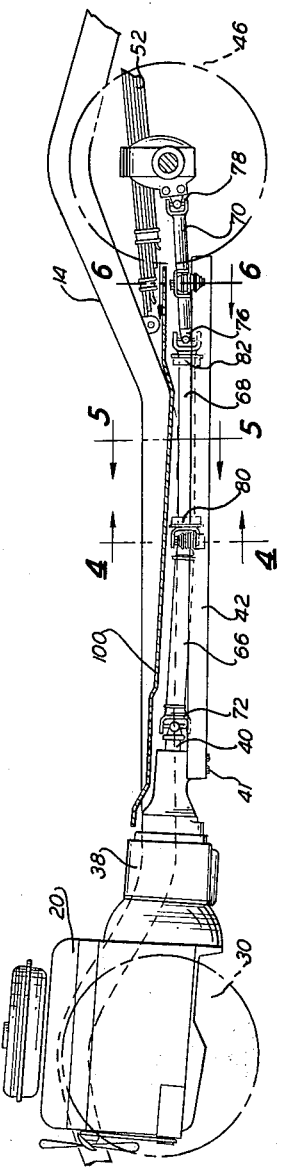
FIGURE 2 is a sectional view taken along section lines 2—2 of FIGURE 1.

Referring to the drawings for more specific details of the present invention, an automobile chassis 10 having a frame 12 is shown in FIGURE 1 incorporating its preferred form. While this invention is described herein in certain specific embodiments, it is amply apparent that with ordinary skill, it is susceptible to other variations. For example, it is equally suited to vehicles of unit construction as well as those having separate frames and bodies. Therefore, as used in the following description and appended claims, the word "frame" includes both the separable and integral type frame or its equivalent.

Frame 12 is composed of side rails 14 and 16 that extend longitudinally through the length of the vehicle. Appropriate cross members such as 18 are provided between the side rails 14 and 16 for support and rigidity.

Located on the forward part of the chassis 10 is an internal combustion engine 20 which for illustrative purposes is shown to be of the well-known V-8 type. The engine 20 is resiliently supported near its front end on rubber mounts 26, 28 which in turn are bolted to brackets 22, 24 riveted to the side rails 14, 16. Pivotally mounted on the front of the chassis frame 12 are independent suspension members for the support of the front wheels 30, 32. These members include right and left upper support arms 34 and 36.

Rigidly secured to the rear end of engine 20 is a transmission having a housing 38 with an output shaft 40 protruding rearwardly therefrom.

The combination making up the chassis 10 also includes rear driving wheels 46 and 48 which are joined by an axle 44 having a differential gear unit 50 interposed at its midpoint for the distribution of power to the wheels 46, 48. The axle 44 is resiliently supported by leaf springs 52 and 54 situated between its ends and the side rails 14 and 16 respectively.

In accordance with the present invention, a U-shaped channel member 42 is secured by means of bolts 41 to the rearmost portion of the housing 38. Channel member 42 extends rearwardly from the transmission housing 38 parallel to the longitudinal axis of the vehicle to a point short of the vehicle's rear axle 44 and is open upwardly.

Welded transversely to the rear portion of the channel piece 42 is a cross member 56 which is also of generally U-shaped configuration. The two members 42 and 56 combine to form a T-shaped supporting structure. The cross member 56 is attached to the side rails 14 and 16 as shown in FIGURE 6 by means of a pair of rubber doughnut members 58, 60 that are in contact with a bracket 62 welded to the side rail 16. A bolt 64 secures the resilient mounting assembly in position. In FIGURE 6 only the support for the left hand end of the cross member 56 is shown; however, it suffices by reason of the fact that the right hand mount is identical.

Shafting means are provided for the transmission of power from the engine 20 through the transmission 38 to the differential 50 for distribution to the road wheels 46, 48. Such means include a segmented drive shaft having serially positioned shaft portions 66, 68 and 70.

Shaft 66 is attached to the output shaft 40 of the transmission 38 by means of a universal joint 72. A universal joint 74 is provided between the juxtaposed ends of the shafts 66, 68 and similarly a universal joint 76 couples the shafts 68 and 70 together. A fourth universal joint 78 is provided to connect drive shaft segment 70 to the differential 50. The universal joints 72, 74, 76, 78 permit the transmission of power between the various units without said units being required to be in axial alignment.

The middle shaft 68 of the three shafts 66, 68, 70 is rotatably secured to the channel member 42 by means of anti-friction bearings 80 and 82. The bearings 80 are held by a metal stamping 84 which, in turn, is resiliently mounted by rubber doughnuts 86, 88 to brackets 90, 92 that are welded to the channel member 42. The second anti-friction bearing 82 similarly rotatably supports the aft end of the shaft 68 and is resiliently carried by rubber mounts 94.

Thus, shaft 66 is freely supported by joints 72 and 74 between the ends of shafts 40 and 68 and shaft 70 is free to pivot about joint 76 as dictated by the movement of the differential 50 and rear axle 44.

The just described structure, including the T-shaped members 42 and 56, supports the rear end of the engine transmission combination 20, 38 on the rubber doughnuts 58, 60. Further, the assembly protects and supports the segmented drive shaft. Such support permits shafting having four universal joints which, in turn, allows that component of the running gear to be located as low as possible. The floor plan and the tunnel formed in the floor pan may likewise be lowered.

In an automotive vehicle having a front mounted engine and rear wheel drive, there are basic limitations upon the minimum height of certain components. The engine and transmission group cannot be mounted below a certain height if appropriate clearance is to be had between the engine's crankcase and ground level. Likewise, little can be done to adjust the height of the differential. Generally, the height of the shaft output of the transmission and the input of the differential are significantly greater than the minimum desired for the floor pan. Consequently, the raised tunnel is provided as a compromise to accommodate the shafting extending between those units.

However, with the present invention means are provided that will readily facilitate a non linear driveline arrangement having a substantial portion fitted below the general height of the transmission and differential. The shafting configuration described herein, that is, four universal joints and three drive shaft sections achieves the aim of a driveline that is adaptable to having a lower central portion and interconnects the higher transmission and differential units. The novel T-shaped structure constitutes a most adequate support for such segmented shafting.

In FIGURES 2, 4, 5 and 6, the floor pan of the vehicle is shown generally by the reference numeral 100. Because the segmented drive shaft 66, 68, 70 is rotatably supported by a member which is fixed in location relative to the frame 12, the floor pan 100 may be further lowered with a reduced clearance between it and the shafts 66, 68 as compared with the common arrangement of having a single shaft connected directly to the rear axle in which case room must be provided for movement in a vertical plane as the rear wheels jounce and rebound.

An additional feature of this invention is the fact that the transmission and engine combination 38, 20 is supported by the T-shaped members 42, 56 at a point near the rear end of the vehicle. In conventional automobile design, the transmission and engine rest upon a cross frame member which extends laterally near the rear end of the transmission. By contrast, the transmission engine mounting scheme of the present invention finds its support at a very substantial distance rearwardly of the more conventional location, thus promoting dampening of engine and road vibrations by better distribution of the loads.

It is desired to have the the longitudinal support member 42 extend rearwardly as far as possible. However, as the shaft section 70 is connected to the differential 50, provision must be made for vertical movement. Contact of the rear wheels 46, 48 with irregularities in the road surface will cause the axle 44 and differential 50 combination to jounce and rebound and swing the shaft section 70 about the universal joint 76. Therefore, the rear end of the support member 42 and the cross member 56 cannot be placed so far back that they will interfere with the moving shaft section 70, but it is properly located just short of such interference.

Figure 3:
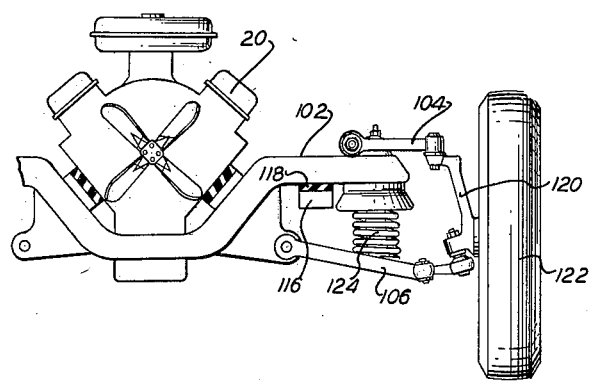
FIGURE 3 is a front elevational view of a vehicle chassis showing a modification of the present invention.
Figure 4:
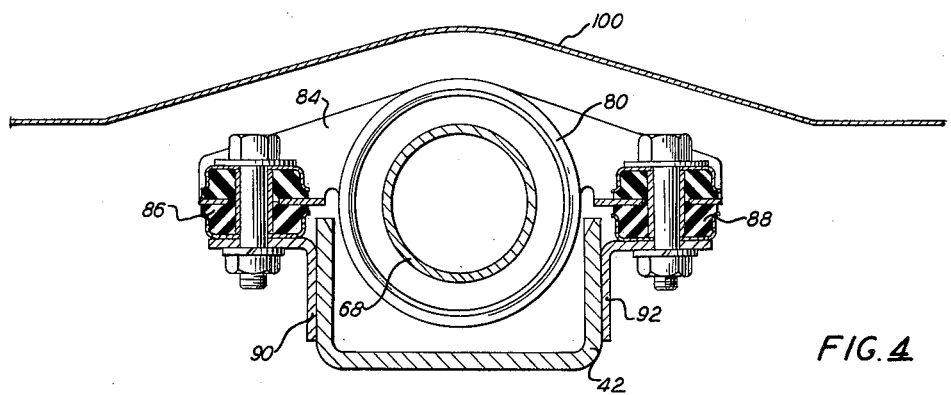
FIGURE 4 is a sectional view taken along section lines 4—4 of FIGURE 2.
Figure 5:
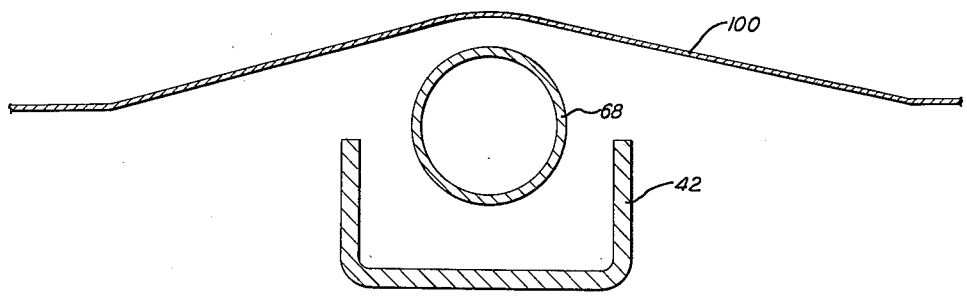
FIGURE 5 is a sectional view taken along section lines 5—5 of FIGURE 2.

A modification of the present invention is disclosed in FIGURE 3 which provides a resilient front engine mount to be used in association with the T-shaped support 42, 56 described above. As shown, the front of the engine 20 is resiliently mounted on a cross frame member 102 and member 102 is secured to the frame side rails 116 by means of rubber blocks 118. This construction is in contrast to the more conventional automotive practice where cross frame members are either welded or riveted to the side rails of the frame rather than resiliently supported thereon.

The cross frame member 102 carries upper and lower wheel support arms 104 and 106. They, in turn, support a spindle member 120 which has a road wheel 122 rotatably affixed thereto. A coil spring 124 is interposed between the lower support arm 106 and the cross frame member 102. This structure conforms to the usual independent suspension for front wheels in automobiles.

The combination of the T-shaped support for the rear of the engine transmission group in association with a front engine supported on a resiliently mounted cross frame member as shown in FIGURE 3 constitutes a novel combination having a high degree of vibration dampening quality. In effect, the major sources of noise and vibration for the vehicle are resiliently mounted at substantially spaced apart points.

A further modification of this invention is shown in FIGURE 7 and relates to the mounting of the aft end of the channel member 42. In this alternate arrangement a cross member 156 is welded at its outer ends to the frame side rails 14 and 16, respectively, rather than being cushioned mounted as was the case of cross member 56. The rear end of member 42 is provided with mounting brackets 158 and 160 which extend transversely of its longitudinal sides. Rubber cushions 162 and 164 are interposed between the cross frame member 156 and the mounting brackets 158, 160 for the support of aft end of the member 42. The obvious difference of the modification of FIGURE 7 from the structure of FIGURE 1 is the spacing of the rubber cushions for rear mounts of member 42. With the arrangement of FIGURE 7, greater resiliency and flexibility is provided for the engine and driveline support with some sacrifice in torsional rigidity. The preferability of the two designs depends upon the specifications and requirements of the particular vehicle which is to incorporate the present invention.

The foregoing description constitutes the preferred embodiment and modifications of the present invention. Obviously, other modifications and applications will occur to those skilled in the art which will come within the scope and spirit of the appended claims.

One minor example of such a modification might have the transmission located elsewhere than directly behind the engine. Therefore, as used in the following claims, the term "engine" is intended to comprehend an engine per se as well as a transmission and engine combination.

What is claimed is:

1. A motor vehicle having sprung and unsprung components; said sprung components including a support structure, an engine resiliently mounted forwardly on said structure, a driveshaft extending rearwardly from said engine, and aft engine support means; said aft engine support means including a subframe having a central member rigidly secured to said engine and extending longitudinally rearwardly therefrom juxtaposed said driveshaft; said subframe having a rear terminus resiliently mounted on said support structure at a point rearwardly of the midpoint of said vehicle; said unsprung components including differential gear means, housing therefor and an axle housing rigidly secured thereto and spaced rearwardly of the rear terminus of said subframe and spring supported from said support structure; a shaft piece interconnecting said sprung driveshaft and said unsprung differential gear means.

2. A motor vehicle having sprung and unsprung components; said sprung components including a support structure, an engine resiliently mounted forwardly on said structure, a driveshaft extending rearwardly from said engine, and aft engine support means; said aft engine support means including a T-shaped subframe having a central member rigidly secured to said engine and extending longitudinally rearwardly therefrom juxtaposed said driveshaft; said subframe having a transverse member at the rear terminus of said central member resiliently mounted on said support structure at a point rearwardly of the midpoint of said vehicle; said unsprung components including differential gear means, housing therefor and an axle housing rigidly secured thereto and spaced rearwardly of the rear terminus of said subframe and spring supported from said support structure; a shaft piece interconnecting said sprung driveshaft and said unsprung differential gear means.

References Cited in the file of this patent
UNITED STATES PATENTS

| | | |
|---|---|---|
| 2,081,214 | Anibal | May 25, 1937 |
| 2,082,826 | Frisby | June 8, 1937 |
| 2,254,282 | Griswold | Sept. 2, 1941 |
| 2,373,356 | Thoms et al. | Apr. 10, 1945 |
| 2,756,835 | Muller | July 31, 1956 |